United States Patent [19]

Featherstone et al.

[11] 4,122,325

[45] Oct. 24, 1978

[54] METHOD OF JOINING TWO SHEET METAL PARTS

[75] Inventors: Harry Edwin Featherstone, Wooster; Walter Grant Sniff, Jr., Smithville, both of Ohio

[73] Assignee: Orrville Products, Inc., Orrville, Ohio

[21] Appl. No.: 760,919

[22] Filed: Jan. 21, 1977

[51] Int. Cl.² ............................................. B23K 11/10
[52] U.S. Cl. ................................ 219/86.1; 219/91.21; 219/92
[58] Field of Search ................... 219/8 C, 91, 92, 86.1, 219/91.21

[56] References Cited

U.S. PATENT DOCUMENTS

| | | | |
|---|---|---|---|
| 1,085,769 | 2/1914 | Thomson | 219/91 |
| 2,305,042 | 12/1942 | Thacker | 219/91 |
| 2,313,941 | 3/1943 | Humphrey | 219/91 X |
| 2,452,805 | 11/1948 | Sussenbach | 219/92 |
| 2,977,672 | 4/1961 | Telfer | 174/68.5 |
| 3,181,235 | 5/1965 | Wallis | 219/92 |
| 3,627,970 | 12/1971 | Weatherman | 219/72 |
| 3,798,407 | 3/1974 | Becker | 219/92 |
| 4,072,843 | 2/1978 | Szabo | 219/91.1 |

*Primary Examiner*—E. A. Goldberg
*Attorney, Agent, or Firm*—Meyer, Tilberry & Body

[57] ABSTRACT

Metal parts are spot welded together. To prevent corrosion of the parts a thixotropic, non hardening, corrosion resistant material including a solvent and having a negligible gravity flow at temperatures less than about 400° F to 440° F and forming a heat insulating coherent gel when burnt is used between the plates. The material is known as Anchor Tuflex #23. The parts are clamped and a pressure, higher than a welding pressure that would be used without the material is used to squeeze out the material. The high pressure is continued during welding. After welding continued pressure, is applied during cooling.

11 Claims, 35 Drawing Figures

WELD
$H_1$ = WELDING TEMPERATURE
$H_2$ > COMBUSTION TEMPERATURE
$H_3$ < COMBUSTION TEMPERATURE
$H_3$ < FLOW TEMPERATURE

| THICKNESS T OF THINNESS OUTSIDE PILE IN REF. NOTE 1 | ELECTRODE DIA. AND SHAPE (REF. NOTE 2+5) D, IN MIN. | d, IN MAX. | NET ELECTRODE FORCE, LB | WELD TIME CYCLES REF. NOTE 3 | WELDING CURRENT AMP. | MIN. CONTACTING OVERLAP L, IN REF. NOTE 6 | MIN. WELD SPACING L TO L IN REF. NOTE 4 | DIAM OF FUSED ZONE IN REF. NOTE 7 |
|---|---|---|---|---|---|---|---|---|
| 0.010 | 3/8 | 1/8 | 240 19,557 PSI | 4 | 4,120 | 3/8 | 1/4 | 0.10 |
| 0.021 | 3/8 | 3/16 | 360 13,038 PSI | 6 | 6,695 | 7/16 | 3/8 | 0.13 |
| 0.031 | 3/8 | 3/16 | 480 17,384 PSI | 8 | 8,240 | 7/16 | 9/16 | 0.16 |
| 0.040 | 1/2 | 1/4 | 600 12,223 PSI | 10 | 9,785 | 1/2 | 13/16 | 0.19 |
| 0.050 | 1/2 | 1/4 | 780 15,890 PSI | 12 | 10,815 | 9/16 | 15/16 | 0.22 |
| 0.062 | 1/2 | 1/4 | 920 18,742 PSI | 14 | 12,360 | 5/8 | 1 1/8 | 0.25 |
| 0.078 | 5/8 | 5/16 | 1265 16,493 PSI | 17 | 14,420 | 11/16 | 1 3/8 | 0.29 |
| 0.094 | 5/8 | 5/16 | 1495 19,492 PSI | 20 | 15,965 | 3/4 | 1 3/4 | 0.31 |
| 0.109 | 5/8 | 3/8 | 1840 16,660 PSI | 23 | 18,025 | 13/16 | 1 7/8 | 0.32 |
| 0.125 | 7/8 | 3/8 | 2070 18,742 PSI | 26 | 19,570 | 7/8 | 2 | 0.33 |

REF. NOTE:

1. TYPE OF STEEL, SAE 1010. MATERIAL SHOULD BE FREE FROM SCALE, OXIDES, PAINT. WELDING CONDITIONS DETERMINED BY THICKNESS OF THINNEST 007 SIDE PIECE T. PILE UP NOT EXCEEDING 4T. MAXIMUM RATIO BETWEEN THICKNESSES 3:1 THICKNESS OF CRS NO. 23 MATERIAL SHOULD BE APPLIED TO ONE SIDE OF THE SPOT WELD JOINT. 10 MILS THICK.

2. ELECTRODE MATERIAL, CLASS 2, MIN. CONDUCTIVITY, 75% OF COPPER; MIN. HARDNESS, ROCKWELL B75

3. WELD TIME IS INDICATED IN CYCLES OF 60 CYCLE FREQUENCY

4. MIN. WELD SPACING IS THAT SPACING FOR TWO PIECES FOR WHICH NO SPECIAL PRECAUTIONS NEED BE TAKEN TO COMPENSATE FOR SHUNTED CURRENT EFFECT OF ADJACENT WELDS. FOR THREE PIECES INCREASE SPACING 30%

NOTE 5

NOTE 6

NOTE 7

METHOD OF JOINING TWO SHEET METAL PARTS

The present invention relates to the art of joining two sheet metal parts and more particularly to joining two sheet metal parts separated by a corrosion resistant material which remains between the parts at the joined seam after the assembly operation.

The invention is particularly applicable for spot welding various sheet metal seams in the production of a cab for a truck and it will be described with particular reference thereto; however, it is appreciated that the invention has much broader applications and may be used for joining two sheet metal parts at a common seam for a variety of different products. More than two sheets could be welded together.

BACKGROUND

In recent years, there has been a substantial amount of activity directed to increasing the life of assembled cabs and bodies for vehicles. Because of the intricacy of the various assembled parts and the relatively small thickness of the metal used, corrosion is becoming a substantial problem, the solution of which is now requiring a great outlay of time and money. The corrosion problem has been compounded by an increase in the amount of salt and other chemicals being applied to the roadways in certain parts of the country. It is now a general objective of most manufacturers of motor vehicles to increase the total life of the vehicle body with respect to corrosion. At this time, it has been suggested that the steel used in the manufacture of vehicle bodies be galvanized or otherwise plated on one or both sides. Generally, the metal coating is on one side so that the other side may easily receive decorative coatings, such as paint. Also, assembled bodies are being dipped in a variety of substances and coated by electrolytic processes with materials which enhance the corrosion resistance characteristics of the body. Even with these various types of methods for attempting to reduce the corrosion of a vehicle body, additional material is required in certain inaccessible locations. This is often done by spraying additional corrosion resistant material into these areas of the body after assembly. All of these procedures have distinct disadvantages. For instance, the galvanizing of steel, or coating of steel with various metals, usually provides a coating on only one side. The painted side remains untreated. The electrical disposition process is quite expensive and must be controlled accurately for uniform results. As the process varies, it is possible to require reprocessing of bodies because of inferior coating by electrical disposition. These types of processes do not provide any substantial or long lasting protection at the seams between joints. In the electrical disposition process, coating is done after the parts are assembled. The same concept is true for various dipping processes. Thus, the seams of an assembled cab or body remain uncoated and can be the source of relatively rapid corrosion during adverse ambient conditions.

In an attempt to protect the seam area of an assembled body, it has been generally the practice to seal the seam at the external portions. This concept functioned on the belief that the exclusion of moisture from the seam would prevent corrosion. However, such procedures are not satisfactory since the moisture inhibiting provision of outside coatings is subsequently deteriorated to the point that moisture will migrate into the seam between assembled metal parts to cause rapid corrosion and combine with oxygen to cause corrosion.

In some instances, parts are painted before they are joined at the seams by spot welding. The paint forms a hardened surface which does not migrate from the welding zones in a spot welding process. Thus, the paint substantially increases the resistance of the spot welding and creates inferior spot welding of the seam. These prepainted parts are generally not successful in a spot welding operation. To overcome this difficulty, the paints have been provided with a powdered metal substance which reduces the resistivity of the paint in the seam area. This allowed spot welding through the seam by using the powdered metal as an electrically conductive path through the seam in the weld zone. This procedure was somewhat expensive and did not result in uniformly satisfactory spot welds. In addition, since the paint hardened on the two parts before spot welding of the seam, the spot welding operation could cause cracking of the paint. In addition, paint could crack during subsequent use. Thus, this procedure of using metal powder in paint for coating surfaces prior to spot welding of the seam is not universally used. In addition, prepainting of parts prior to spot welding causes handling difficulties and increases the complexity of subsequent decorative coating when the parts are to be used in components for motor vehicle cabs or bodies.

SUMMARY OF INVENTION

The present invention relates to a new method of joining two sheet metal parts at a common seam, which method employs the selection of a corrosion resistant material having specific mechanical characteristics and then applying this material to at least one of the surfaces prior to spot welding of the joint. In this manner, the corrosion resistant material is sandwiched between the two sheet metal parts forming the seam to provide corrosion resistance within the seam itself. The present invention is the first successful spot welding of a seam using a selectively applicable corrosion resistance material of the type forming a long term, self sealing corrosion resistant protection.

The present invention relates to the concept of seam welding two sheet metal parts together with an intermediate layer of non-hardening, high temperature corrosion resistant material. The material used in the invention has certain physical characteristics one of which is that it does not flow at relatively high temperatures up to 400° F. to 440° F. Since the material does not flow at high temperatures, spot welding can be accomplished without loss of the material from between the two surfaces forming the spot welded seam. The invention is applicable for use in relatively thin sheet metal parts. Relatively "thin" indicates that the sheet metal is approximately 0.010 to 0.125 in thickness. The preferred embodiment of the present invention involves the spot welding of two relatively thin sheet metal parts formed from the normal type of steel used in production of cabs and bodies for motor vehicles. Also, the process can be used for other metal parts, such as relatively thin aluminum sheet metal parts. In the preferred embodiment the thickness is 0.020 to 0.080.

In accordance with one aspect of the present invention there is provided a method as defined above for joining first and second sheet metal parts along a common seam formed from a first surface on the first part and a second surface on the second part. The surfaces are in abutting relationship and have a corrosion resistant layer therebetween. This method comprises the steps of providing a thixotropic, non-hardening corrosion resistant material including a solvent and having a negligible gravity flow at temperatures less than about 400° F. to 440° F. and forming a heat insulating, coherent gel when the solvent is burnt; applying a layer of the material of at least about 6–10 mils over the first surface; clamping the first and second surfaces together to form the common seam; placing spot welding electodes on opposite sides of the seam and engaging the clamped metal parts at a weld zone extending through the parts; forcing the electrodes together at a selected pressure; continuing the forcing step until the material is squeezed from the weld zone between the surfaces less than about 1 mil; then passing a welding current of a selected amperage between the electrodes for a weld time sufficient to melt the metal of the parts at the surfaces and in the weld zone while continuing the forcing step; thereafter, continuing the forcing step for a time sufficient to allow solidification of the melted metal of the parts in the weld zone.

In accordance with another aspect of the present invention, the selected pressure as mentioned above is approximately 15-20% greater than the electrode pressure necessary for spot welding third and fourth parts, respectively identical to the first and second parts at the seam and without the material therebetween.

In accordance with still a further aspect of the present invention the selected amperage as mentioned above is approxi- 2.5–3.5% greater than the electrode amperage necessary for spot welding third and fourth parts, respectively identical to the first and second parts at the seam and without the material therebetween.

Still a further aspect of the present invention is the provision of a method as defined above wherein the continuing step includes continuation of said selected pressure for a time in the range of about 16–67 milliseconds.

In accordance with another aspect of the present invention there is provided a method as generally described above wherein the solvent from the material is allowed to evaporate from the first surface in ambient conditions for a time greater than about five hours. In accordance with this method, the electrode forcing step is performed until movement of the electrodes toward each other is substantially halted by reactive forces from the two assembled parts. Thereafter, the welding current of a selected amperage is passed between the electrodes for the weld time. In this manner, the material between the two assembled parts is squeezed together and then forced from the weld zone. This additional time necessary to force the material from the weld zone allows general metal to metal contact in the weld zone preparatory to spot welding. In this manner, there is no arcing between abutting surfaces during the welding operation. If time is not allowed for squeezing the material from the weld zone defined by the two spaced electrodes, arc can occur between the surfaces which can cause splattering and disrupt the total spot welding operation.

In accordance with another aspect of the present invention, the time of evaporation may be greater than about 48 hours before the parts are clamped together. In this instance, the product of the weld time and the square of amperage is at least 10% greater than the product of the weld time and the square of the electrode amperage necessary for spot welding the first and second parts but when the clamping is less than about 1 hour after application of the material. In accordance with this method, the squeeze time between the time when the electrode movement is basically stopped and the final position of the electrode, is about 50–60 milliseconds.

In accordance with still another aspect of the present invention, there is provided a method as defined above wherein the forcing step between the electrodes is continued with the selected pressure until the rate of change in thickness of the layer of corrosion resistant material per time is substantially zero, i.e. less than about 1 mil.

In accordance with yet a further aspect of the present invention there is provided a method as generally described above which can be defined as including the steps of heating the material surrounding the weld zone to a temperature to burn the solvent from the material and form an annular, heat insulating gel barrier between the material layer and the weld zone. This gel barrier protects the layer of material and expands outwardly from the weld zone to form an annular chamber around the weld zone. Thereafter, the spot welding operation is discontinued and the welding zone cools. During cooling, the material surrounding the weld zone forces the gel barrier radially inwardly toward the nugget formed in the spot welding operation to basically fill the annular chamber in the weld zone. This gel forming operation provides an annularly substantially continuous barrier around the solidified metal or nugget of the weld zone to prevent moisture ingress and corrosion of the weld nugget.

In accordance with still a further aspect of the present invention there is provided an improvement in a method of spot welding first and second sheet metal parts along a common seam formed by a first surface on the first part and a second surface on the second part. This improvement includes inserting a corrosion resistant layer between the surfaces prior to the clamping and spot welding of the two parts. This material includes a suspension of a carrier, a corrosion resistant agent and a carrier solvent and is thixotropic, non-gravity flowable at temperatures above about 400° F. to 440° F. capable of forming a heat insulating, pliable, coherent gel upon burning of the solvent and is non-hardenable after prolonged times of use.

Another aspect of the invention as defined immediately above is that the carrier of the material is a metallo-organic complex. In accordance with another aspect, this metallo-organic complex or compound is used with a corrosion resistant agent that is a phosphate resin. The complex is calcium based.

By using the method as defined above, it is now possible to spot weld two sheet metal parts forming a cab or body of a vehicle with a coextensive intermediate layer of a rust inhibiting or corrosion preventing, non-hardenable material, which material surrounds each of the nuggets formed during the spot welding and prevents ingress of corrosive agents between the two assembled members. The use of a non-hardenable corrosion resistant material between two spot welding sheet metal parts and a method which precludes the material from inhibiting the normal operation of the spot welding system is new and novel and solves many of the problems now being investigated by the motor vehicle industry. After the spot welding has been done to provide a non-hardenable corrosion resistant material between two generally flat, thin sheet metal parts, the total vehicle cab or body is then subjected to normal rustproofing which includes spraying of rustproofing material to inaccessible areas and undercoating the body to provide protection to the underside of the cab or body. Consequently, the present invention relates to an improvement in a system for protecting the cab or body, which system provides actual rustproofing material between the seams of a spot welded joint in the body or cab. The material can be cleaned from any part by a solvent, such as an aromatic solvent for subsequent painting or other treatment of exposed surfaces. Thus, oozing of the material from the seam does not inhibit subsequent processing of the cab or body, such as bath applications.

In accordance with the preferred embodiment of the invention, as defined above, the method can be performed by clamping the workpieces together within about one hour. This produces one type of operation. In accordance with another type of operation, the material can be exposed to ambient conditions which allows rapid evaporation of the solvent from the material coated on one surface preparatory to spot welding. In that instance, the present invention utilizes slightly different parameters. In either instance, the basic operation during the spot welding procedure is the same and allows uniform nuggets and sound spot welding on a repetitive, production type basis.

The primary object of the present invention is the provision of a method of joining first and second sheet metal parts along a common seam, which method and apparatus provides a non-hardening rust inhibiting or corrosion preventing layer between the two parts and at the seam.

Another object of the present invention is the provision of a method as defined above, which method employs a thixotropic corrosion resistant material which does not flow at high temperature and does not flow from between the parts during spot welding thereof.

Still a further object of the present invention is the provision of a method for joining first and second sheet metal parts along the common seam by spot welding the two parts together which method employs the step of providing a thixotropic corrosion resistant material between the parts which material remains in the seam after spot welding thereof.

Still a further object of the present invention is the provision of a method as defined above, which method provides an assembled part including two sheet metal parts welded together at a seam which seam is coated with a corrosion resistant material that is non-hardenable and remains in the seam. More than two sheets can be spot welded simultaneously.

These and other objects and advantages will become apparent from the following description.

BRIEF DESCRIPTION OF DRAWINGS

In the specification, the following drawings are incorporated for illustrative purposes.

GENERAL DESCRIPTION OF THE INVENTION

Figures 1, 2, 2A:
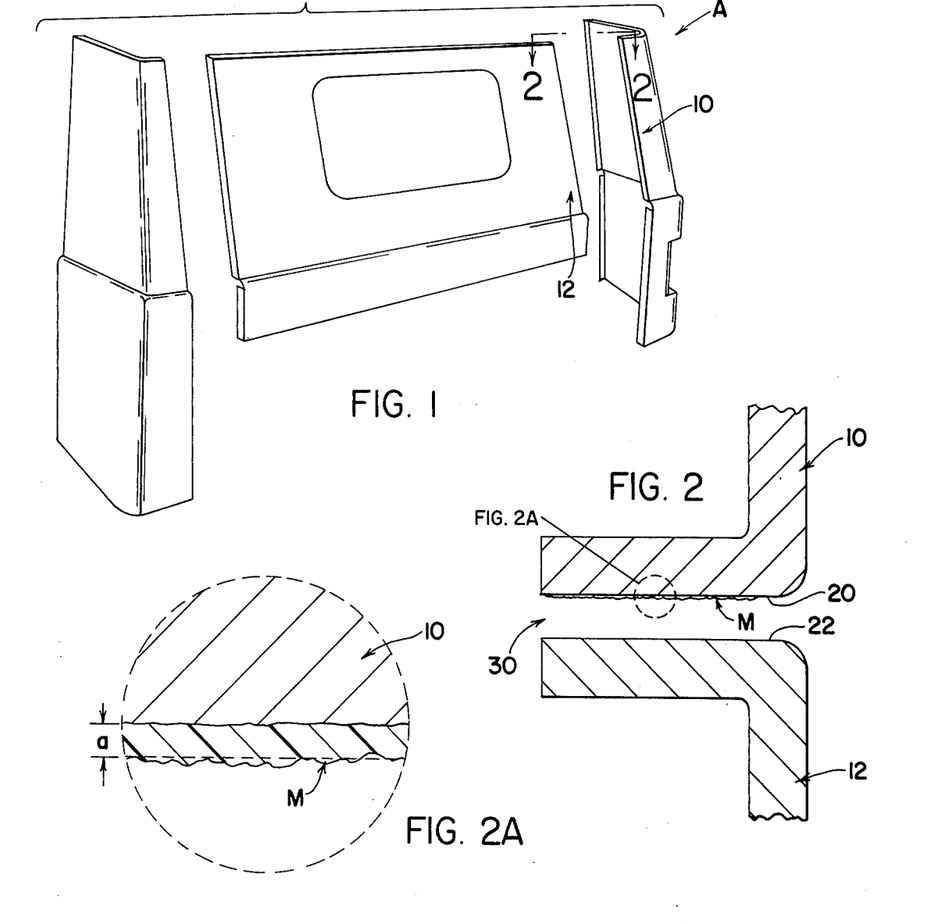
FIG. 1 is a pictorial view illustrating a portion of a truck cab utilizing the present invention.
FIG. 2 is an enlarged cross-sectional view taken along line 2—2 of FIG. 1.
FIG. 2A is a magnified cross-sectional view of the circled area in FIG. 2.

Referring now to the drawings, wherein the showings are for the purpose of illustrating the preferred embodiments of the invention only, and not for the purpose of limiting same, FIGS. 1 and 2 show a cab A formed of sheet metal parts, two of which are parts 10, 12 each formed from 0.020–0.080 inch SAE 1010 steel. Each of these parts has a generally flat surface 20, 22, respectively, which define a seam 30 to be spot welded together. In accordance with the illustrated embodiment of the invention, a non-hardening rustproofing or corrosion resistant material M is provided with a thickness of approximately 6–10 mils on at least one of the surfaces 20, 22. In the illustrated embodiment, the material is applied to surface 20 prior to clamping the surfaces together and spot welding them at seam 30. Thickness a shown in FIG. 2A represents the general thickness of the material M on surface 20. Before explaining the invention, some characteristics of the material M will be set forth. The sheets 10, 12 are generally the same thickness.

CHARACTERISTICS OF CORROSION RESISTANT MATERIAL

In practicing the present invention, a corrosion resistant material having specific characteristics has been selected. This material generally includes a non-separable mixture or suspension of a thixotropic carrier, a corrosion inhibiting compound and a solvent for controlling the viscosity of the material. As will be explained later the corrosion resistant material used in the present invention was selected to have other physical properties. At temperatures of less than about 400° F. to 440° F., the material does not flow or sag under gravity force influence. When the solvent is burnt away, the material forms a pliable, coherent, heat insulating gel which forms a thermal barrier between the heat of combustion of the burning solvent and remaining portions of the material. The material should not harden after prolonged times, exceeding 6 to 8 weeks, as the solvent is progressively evaporated from the mixture. Also, the material has a mechanical affinity for metal much like a heavy grease and may be applied with the metal surface in any position. Although known corrosion resistant material meeting these characteristics can be used, in accordance with the present invention, Anchor Tuflex No. 23 material was developed for use in the present invention and has the general properties set forth in this disclosure. This material is a metalloorganic compound or carrier having a phosphate resin corrosion inhibit and is marketed by Jenkin-Guerin Inc. of St. Louis, Missouri. The material has a density of 7.7 pounds per gallon, a flash point of 124° F. (ASTM D-93 PMCC), 56% by weight of nonvolatiles, and no gravity induced flow at 440° F. The material remains flexible at all operating temperatures to prevent undercutting by corrosion and the propagation of rust or corrosion under protective coatings. The base metal is calcium.

SPOT WELDING CHARACTERISTICS

Figure 3:
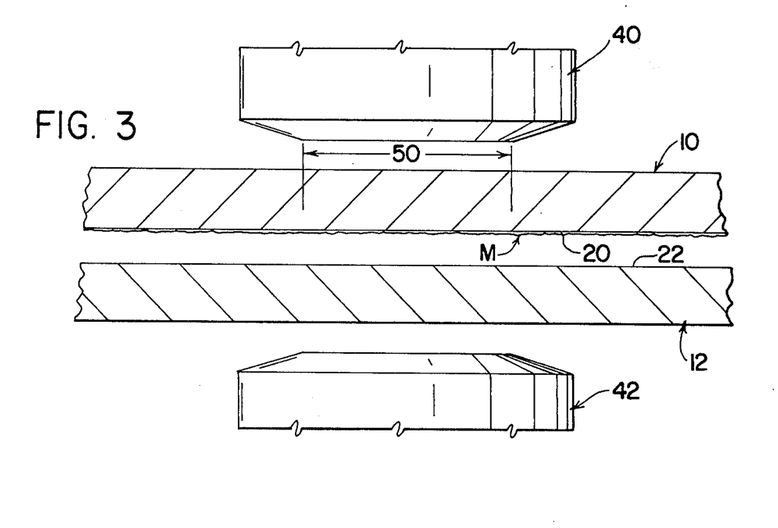
FIG. 3 is an enlarged view showing the spot welding electrodes for spot welding two sheet metal parts and the sheet metal parts, in cross-section, to be spot welded thereby.
Figure 4:
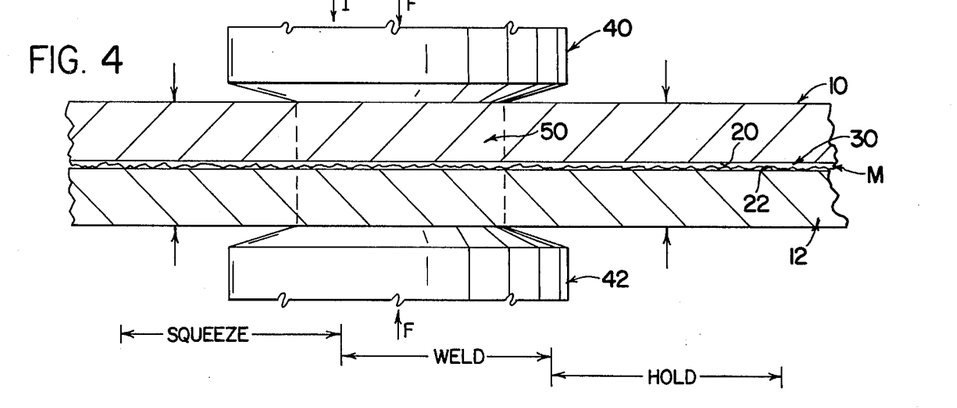
FIG. 4 is a view similar to FIG. 3 showing two sheet metal pieces clamped together and with the electrodes in place for spot welding, together with a schematic representation of the normal type of spot welding cycle.
Figure 4A:
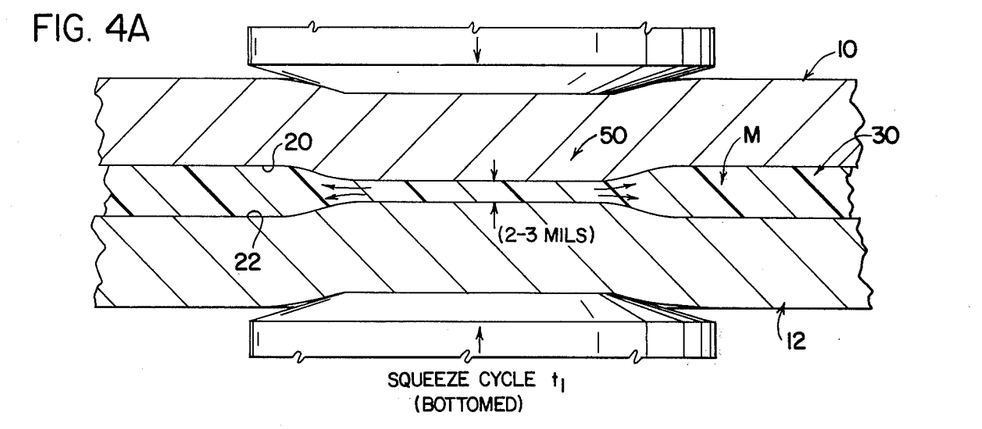
FIGS. 4A–4D are enlarged, cross-sectional views showing, schematically, operating characteristics of the preferred embodiment of the present invention for spot welding sheet metal parts in a manner illustrated schematically in FIG. 4.
Figure 4B:
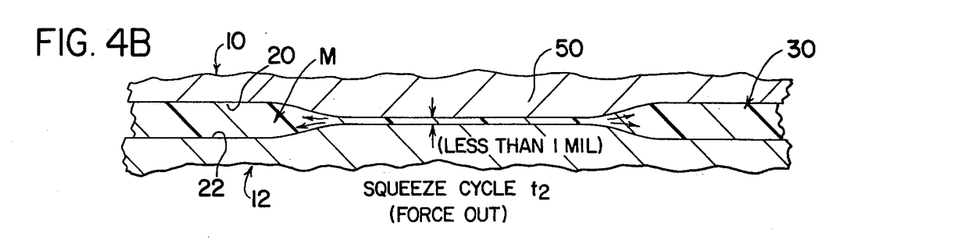
Figure 4C:
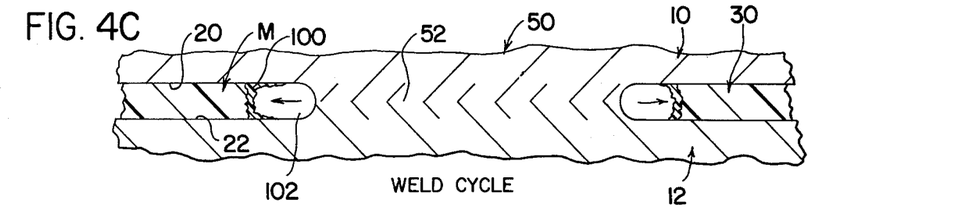
Figure 4D:
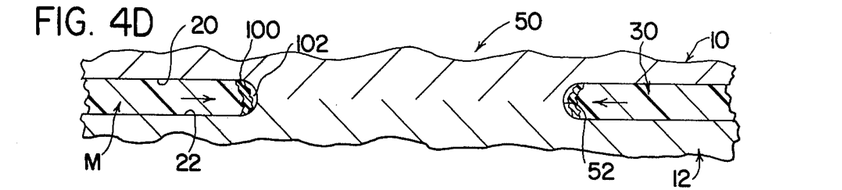

After material M is applied to surface 20, the surface is clamped together and then electrodes 40, 42, as shown in FIG. 3, are pressed together and electrical current is passed through the electrodes to spot weld first part 10 and second part 12 at a welding zone 50 to form a spot welded nugget 52, to be shown later. Of course, the spot welding operation is performed at various spaced positions on seam 30 to hold parts 10, 12 in fixed relationship with an intermediate layer of material M. Certain characteristics of the contemplated invention are illustrated in FIGS. 4 and 4A–4D. As shown in FIG. 4, after parts 10, 12 are clamped together along the arrows illustrated in this drawing, electrodes 40, 42 are placed in the desired position to define welding zone 50. At first, the electrodes 40, 42 are squeezed together with a selected force F. Thereafter, a current I having a desired amperage is passed between electrodes 40, 42 for raising the temperature of the metal in zone 50 and at surfaces 20, 22. This causes fusing of the abutting surfaces. As shown in FIG. 4A, when electrodes 40, 42 are squeezed together, the reactive force of material M causes a separation schematically illustrated as being approximately 2–3 mils. This spacing is decreased gradually due to the thixotropic nature of material M. As the force is continued between electrodes 40, 42, material M is squeezed down to a thickness of less than about 1 mil between surfaces 20, 22. This is shown in FIG. 4B. At that time, welding current is applied across the electrodes. If welding current were applied across the electrodes while surfaces 20, 22 are spaced as shown in FIG. 4A, arcing would occur and spot welding would be sporatic and unacceptable for production. Thus, there is a necessity, in accordance with the invention, to provide sufficient time and squeeze cycle of the spot welding operation to assure that the viscous, thixotropic material of material M is squeezed from between surfaces 20, 22 at weld zone 50. Thereafter, the current passing through the electrodes will cause melting of the metal adjacent surfaces 20, 22, as shown in FIG. 4C. The welding heat burns material M adjacent weld zone 50 to produce a heat insulating, pliable coherent gel ring 100 surrounding the nugget 52 formed during the spot welding operation. This burning action of material forms ring or gel 100 and also causes expansion of gases within annular chamber 102. This forces gel 100 radially outwardly from the hot nugget 52. Thereafter, current I is discontinued and force F is maintained between electrodes 40, 42 until solidification of nugget 52 occurs at surfaces 20, 22. This action produces an integral nugget, as best shown in FIG. 4D. After solidification has occurred, electrodes 40, 42 are withdrawn and the gel 100 is forced into the cavity or chamber which has a reduced internal gas pressure as the surrounding material cools. Thus, the gel 100 forms an integral moisture inhibiting barrier around spot weld nugget 52. Since material M does not flow at high temperatures and is insulated from the high temperature at zone 52 by gel 100, there is no tendency to melt the total layer of material M and allow it to be forced from the seam 30. This produces the uniform spot weld while not causing outward flow and disappearance of the intermediate rustproofing or corrosion inhibiting material M.

Figure 9:
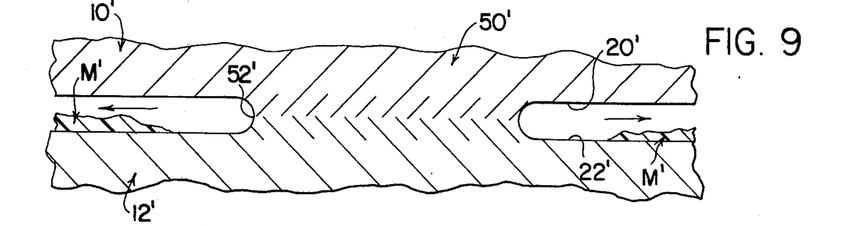
FIG. 9 is an enlarged schematic cross-sectional view showing the operating characteristic which is overcome by the present invention.
Figure 10:
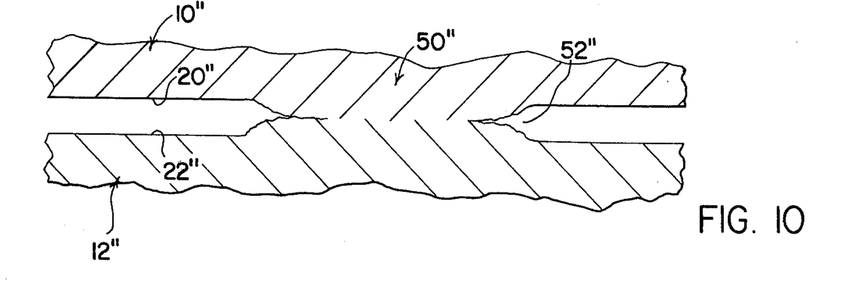
FIG. 10 is a view similar to FIG. 9 showing another operating characteristic which is overcome by the present invention.

Referring now to FIG. 9, parts 10', 12' having facing surfaces 20', 22' are welded to produce a nugget 52'. In this particular instance, an intermediate material M' having a low melting point is used. Such material also does not form a ring around nugget 52'. Consequently, material M' flows from between surfaces 20', 22'. In this instance, the final seam would have a very limited corrosion resistance and would not have an integral layer of corrosion material with integrity over the total surface of a spot welded seam. Thus, FIG. 9 shows the use of a material not having the characteristics required for the material used in the present invention. In a like manner, FIG. 10 shows two spaced parts 10", 12" with facing surfaces 20", 22" with a weld zone 50" and a nugget 52". This view is a schematic representation of a material which is coatable, but not thixotropic so that it can not be squeezed from between the two surfaces 20", 22" as pressure is applied by electrodes. In that instance, sufficient material is captured and remains between the two surfaces and prevents an integral nugget over the total area in the weld zone 50". Thus, FIGS. 9 and 10 illustrate two instances where the material used does not meet the requirements of the present invention regarding high temperature flowability and thixotropic nature. The resultant deficiencies were obtained by experimentation with various rustproofing materials. In FIG. 9, the material would melt and flow from between the surfaces 20', 22'. In FIG. 10, during the squeeze operation, material was compressed between surfaces 20", 22" and inhibited the flow of welding current. The capture of substantial material, i.e. over about 2–3 mils, can be caused by failure to employ additional time at the end of the squeeze cycle or by using non-thixotropic material that will flow at high pressure.

Figure 5:
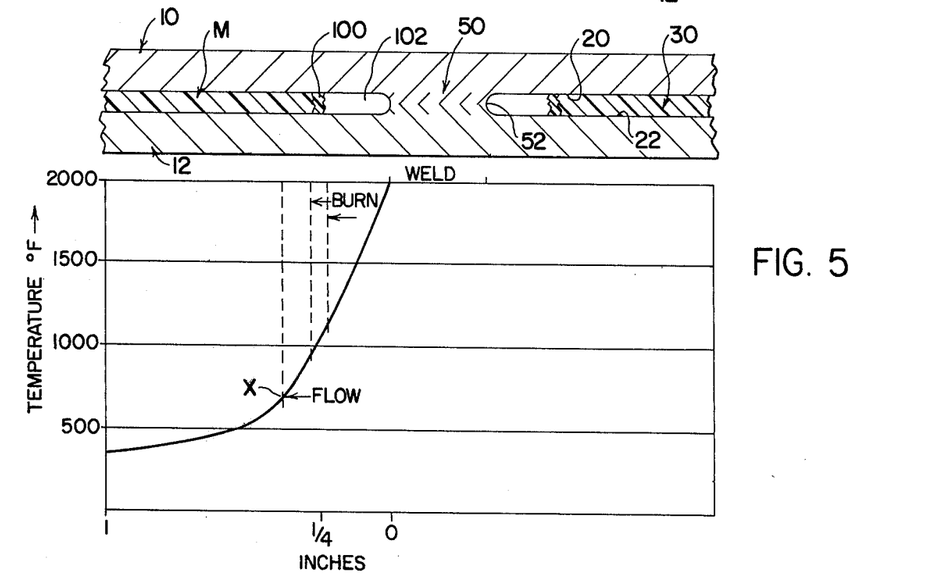
FIG. 5 is a schematic, enlarged cross-sectional view illustrating the feature of the invention as used in FIG. 4 with a graph for explanatory purposes.

Referring now to FIG. 5, the graph at the bottom of the figure illustrates the temperature gradient during the welding operation. As can be seen, the gel 100 formed by burning material M allows flow until the material reaches the non-flowing condition at about point X. Gel ring 100 isolates the material M behind the ring to prevent conduction of heat from weld zone 50 to the material so that the material does not flow from between the surfaces.

Figure 6:
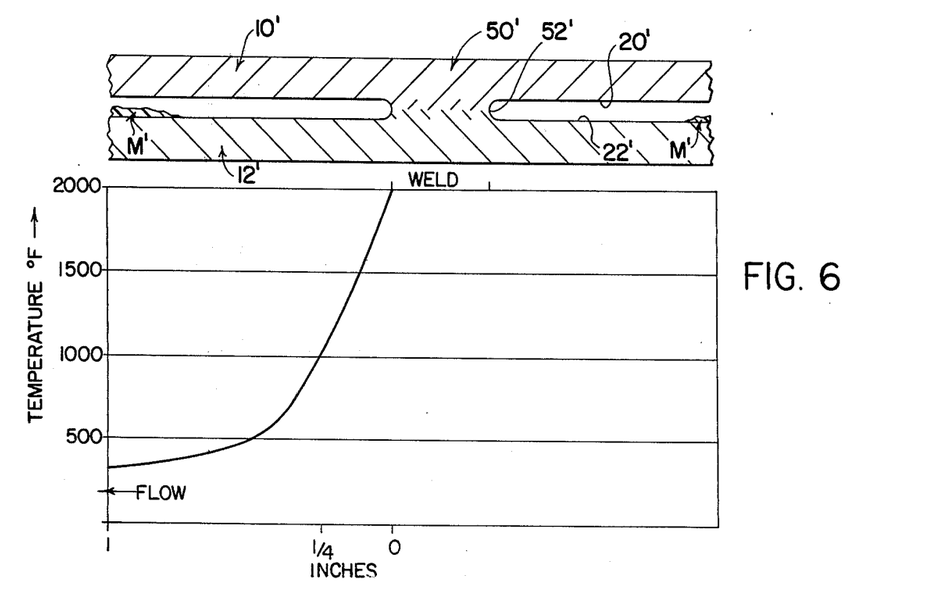
FIG. 6 is a view similar to FIG. 4 showing an operating characteristic which is overcome by the present invention.

FIG. 6 which is similar to FIG. 9, illustrates how the material M' flows from between surfaces 20', 22' as the heat radiated from zone 50' melts the material a sufficient distance from the actual spot welding nugget.

Figure 7:
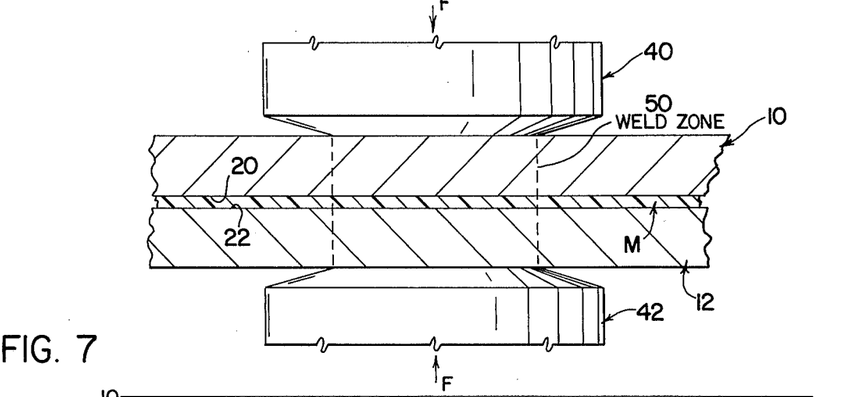
FIG. 7 is a schematic, enlarged cross-sectional view together with a graph showing another operating characteristic of the present invention.

Referring now to FIG. 7, this figure illustrates another operating characteristic of the present invention. Curves $r$, $s$, $t$ and $v$ represent basically the general profile of the relationship between time in cycles and the thickness in mils of layer M as force F is applied between electrodes 40, 42. Each of these curves represents a different profile for the time during which material M is exposed to atmosphere before being clamped together preparatory to spot welding. Curve $r$ represents the profile when parts 10, 12 are clamped together in less than one hour after material M is applied to surface 10. In that instance, thickness of material M is decreased rapidly to the point represented as $K_{T1}$. At that time, a squeezing action or dash pot action occurs. The thickness of the material M is rapidly decreased to the minimum which is somewhat less than about 1 mil. Thus, the curve $r$ is basically vertical and then horizontal. The differential in thickness for differentials in time is thus shifted from infinite to zero quite rapidly. Curve $s$ relates to a material M which has been exposed to atmosphere on surface 20 at a thickness of between 6 and 10 mils for about five hours. It is noted that the slope of the curve is approximately vertical until $K_{T5}$. At that time, there is a gradual shift to the horizontal. At approximately two cycles, the $K_{T5}$ is at zero. The next curve $t$ represents material M which has been exposed to atmosphere for approximately 20 hours prior to clamping and spot welding. Again, there is a more gradual shift from the vertical to the horizontal. For material which is exposed over about 48 hours, as represented by curve $v$, there is even a more gradual shift between the vertical and the horizontal portions of the curve. FIG. 7 illustrates the concept that as the material is exposed to atmosphere before clamping, the length of exposure changes the time, in cycles, from the initial resistance of material M to movement of electrodes 40, 42 to the position wherein the material is at a thin layer for spot welding. This thin layer is determined by the force F and resiliency of sheet metal parts 10, 12. As illustrated, this increase in time to reach a final thickness is between about 0 cycles and 7 to 8 cycles of a 60 cycle source. When spot welding two parts 10, 12 under normal conditions, electrodes 40, 42 move toward each other into the spot welding position at a somewhat vertical relationship between distance and time. There is no dash pot effect caused by the presence of intermediate material M. Thus, when using intermediate material M, there is a need for increasing the squeeze time to accommodate the dash pot effect and to assure substantial metal-to-metal contact prior to spot welding. Without this increased squeeze time, deficiencies can occur in the spot welding. Also, splattering or flashing can occur. Spot welding is done after the curves $r$, $s$, $t$ or $v$ are at the horizontal position, which produces the minimum thickness of material M.

Figure 8:
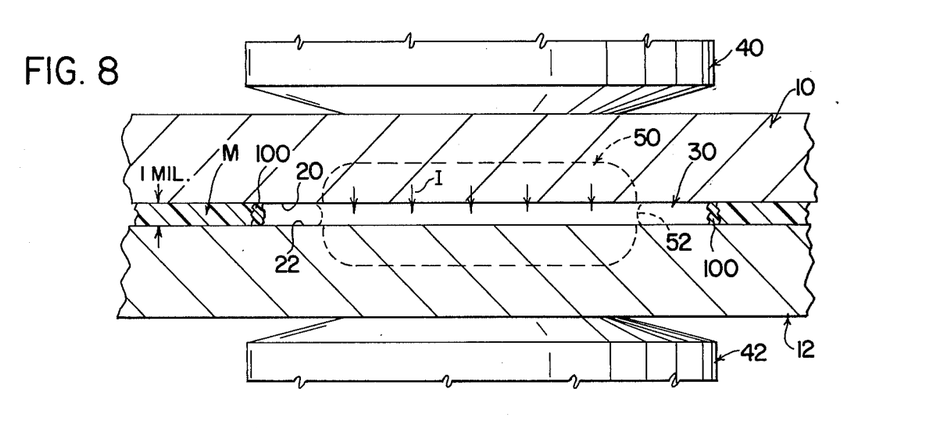
FIGS. 8, 8A and 8B are enlarged, cross-sectional views similar to FIGS. 4C and 4D illustrating the chamber forming characteristic of the preferred embodiment of the present invention.
Figure 8A:
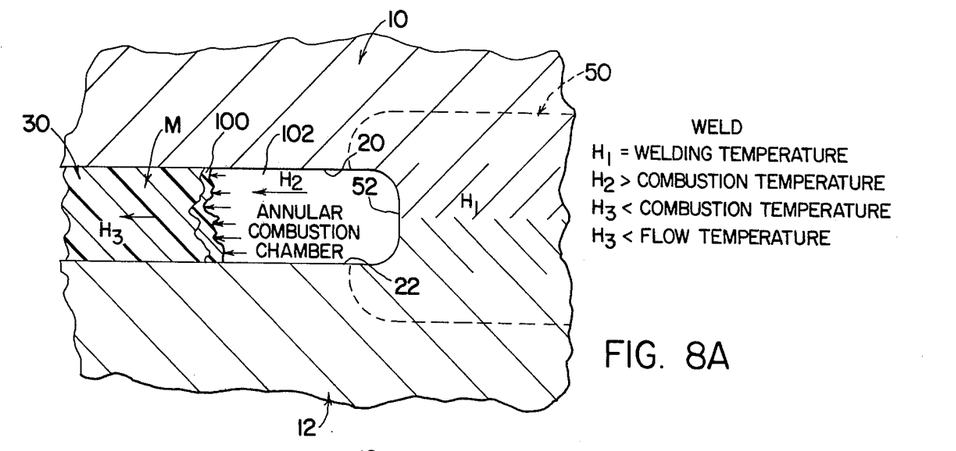
Figure 8B:
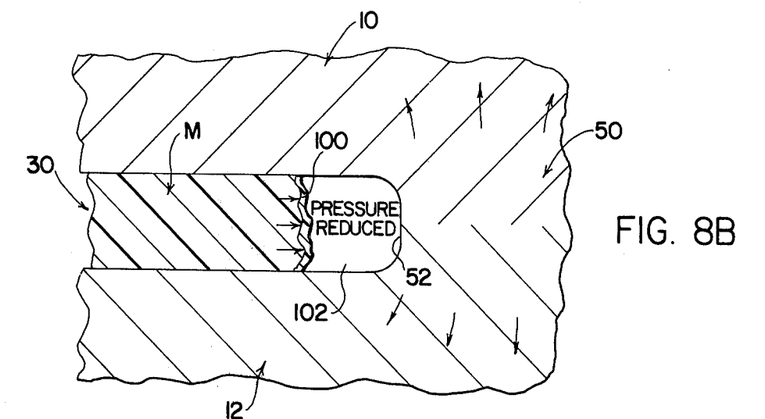

FIGS. 8, 8A and 8B are more detailed illustrations of the function of pliable, coherent heat insulating gel ring 100. As illustrated in FIG. 8, gel 100 is formed when the metal adjacent surfaces 20, 22 is heated to the welding temperature. This forms a generally annular combustion chamber 102 surrounding nugget 52 in weld zone 50. The gases are forced outwardly against gel 100. Temperature $H_1$ of zone 50 is the welding temperature of the metal forming sheet metal parts 10, 12. In chamber 102, temperature $H_2$ is lower than the welding temperature; however, this temperature is sufficient to expand the gases caused by burning of the material M in the combustion chamber. Gel 100 acts as an annular, expanding piston and forces material M outwardly from circular nugget 52. This movement of gel 100 forces material M radially outwardly from the outer rim of gel 100. Material M is at a temperature $H_3$ at a position spaced outwardly from gel 100. This temperature $H_3$ is below the combustion chamber temperature $H_2$ and is below the flow temperature of material M. Consequently, material M spaced outwardly from the gel 100, is not burnt. This is shown graphically in FIG. 8A. In FIG. 8B, nugget 52 has cooled. The pressure in chamber 102 decreases and allows material M to force annular gel 100 inwardly toward nugget 52. This surrounds the nugget with material M and encapsulates the nugget from ingress of moisture. Consequently, an impervious layer M is maintained between surfaces 20, 22 for long term corrosion resistance.

Figure 11:
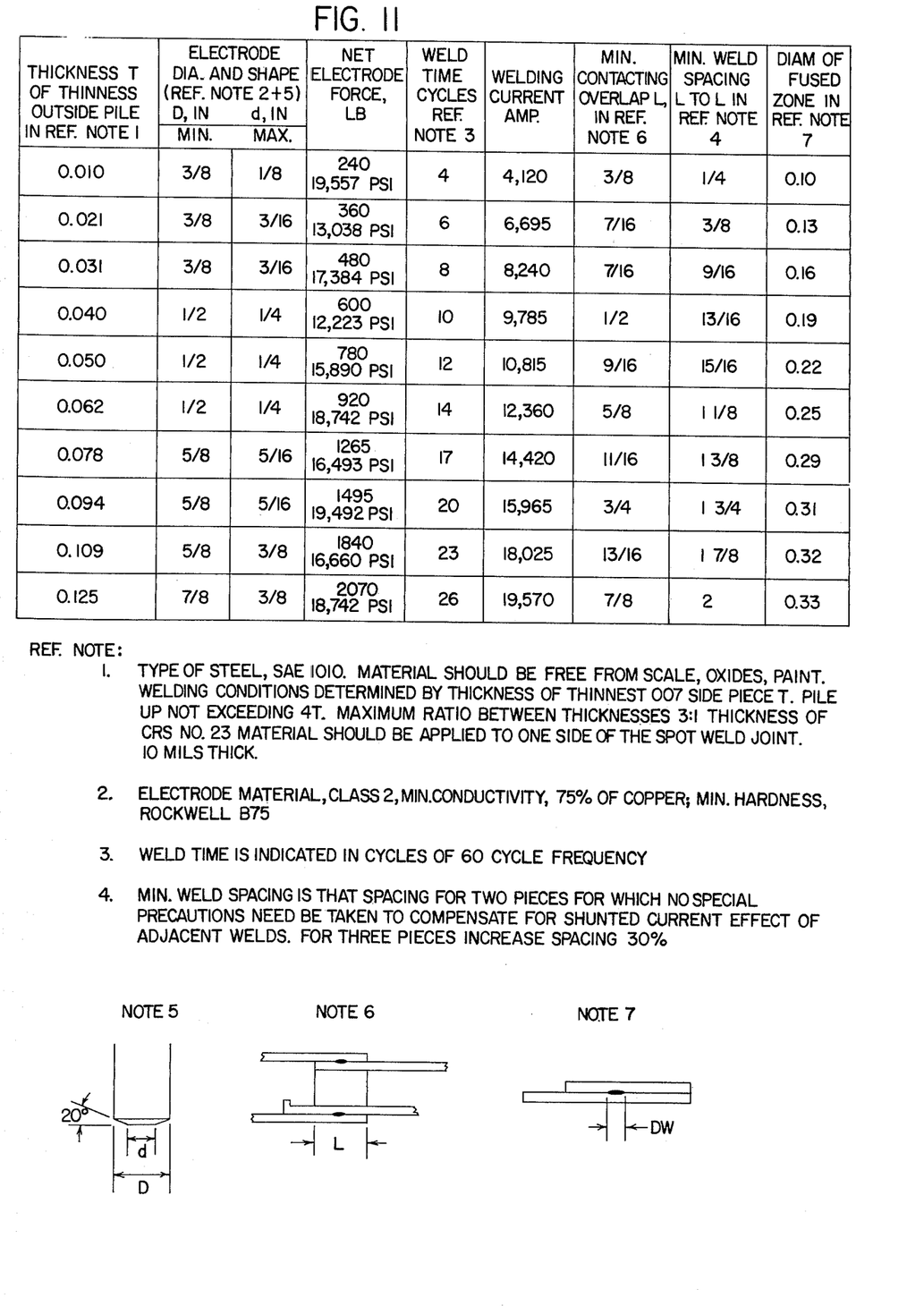
FIG. 11 is a chart illustrating settings to be used in the preferred embodiment of the invention for providing spot welds for different thicknesses of sheet metal workpieces when the material is applied and spot welded within about 1–5 hours.
Figure 12:
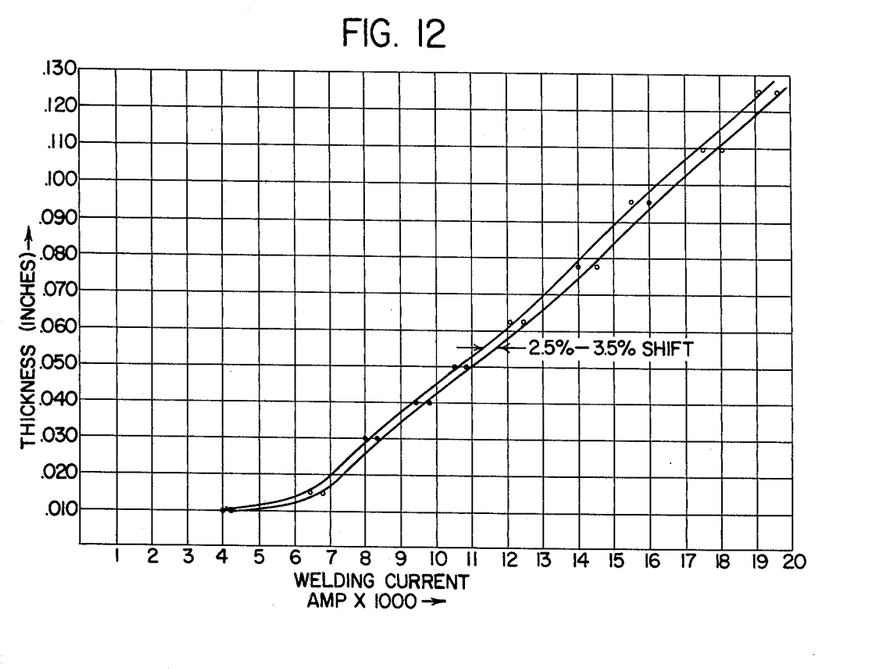
FIG. 12 is a graph showing the relationship between the welding current of FIG. 11 and somewhat standard welding currents for the spot welding of steel.
Figure 13:
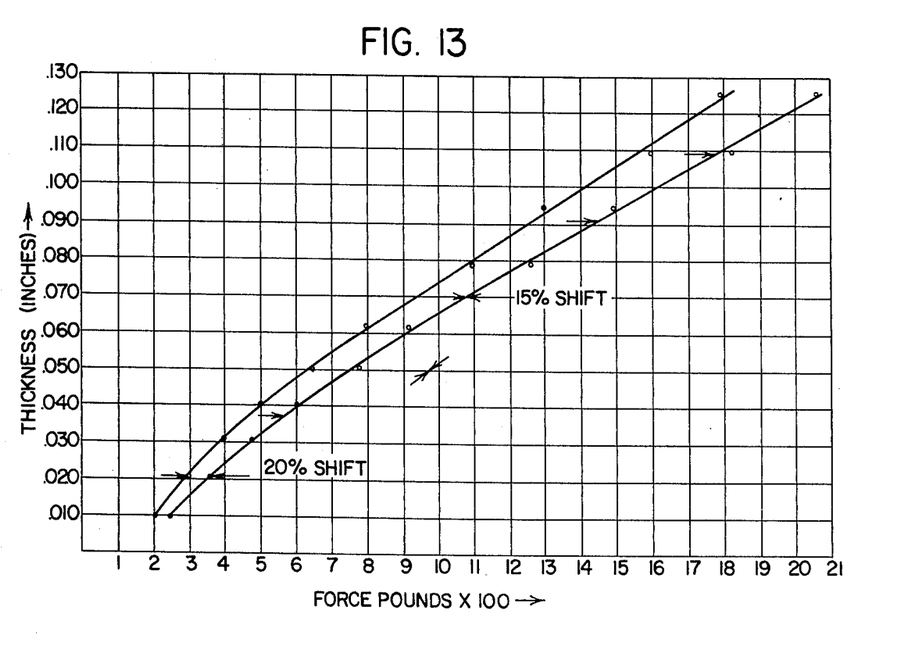
FIG. 13 is a chart illustrating the electrode forces used in the preferred embodiment of the present invention, as shown in FIG. 11 and compared with somewhat standard spot welding parameters.
Figure 14:
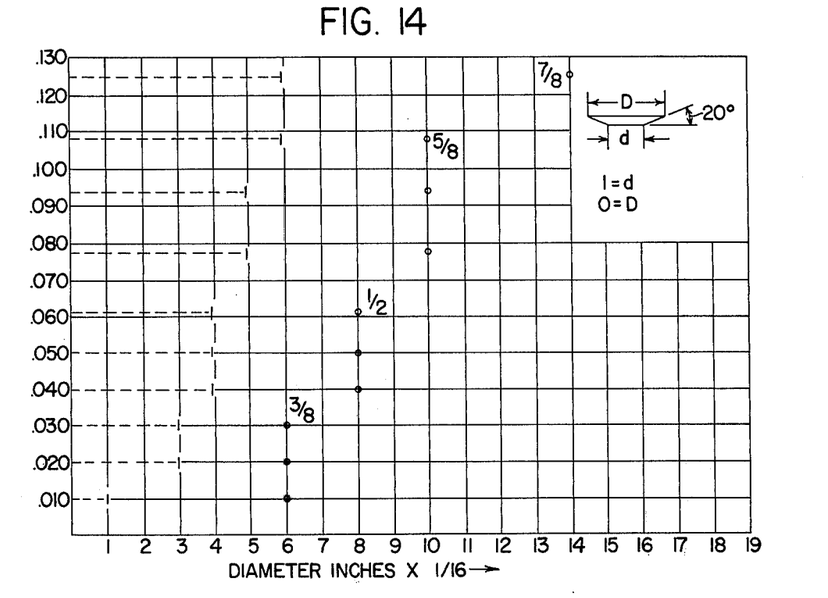
FIG. 14 is a chart showing the size of electrodes employed for different thicknesses of the workpieces used in the present invention, as shown in FIG. 11.

FIG. 11 is a chart disclosing parameters for use in spot welding SAE1010 steel by employing the preferred embodiment of the invention. Basically, the present invention is used for spot welding sheets having a thickness T in the general range of 0.020 and 0.070. As will be apparent, the electrode force used in the example shown in FIG. 7 is approximately 15–20% greater than the force used when spot welding sheet metal parts 10, 12 together without an intermediate layer M. Thus, the electrode force is increased approximately 15–20% as graphically illustrated in FIG. 13. Also, the welding current of FIG. 11 is increased by between 2.5 and 3.5% in the preferred example, as shown graphically in FIG. 11. This increase in current is over the welding current used in welding parts 10, 12 without an intermediate layer M of the type contemplated by the present invention. This concept is graphically illustrated in FIG. 12. The selection of electrodes as shown in FIG. 11 is graphically illustrated in FIG. 14. The vertical lines indicate the interior diameter which primarily determines the dimension of the weld zone. The circles on FIG. 14 indicate the outer diameter D for the electrodes used in accordance with the example illustrated in FIG. 11. By using the parameters of FIG. 11 and material M having characteristics so far described, SAE1010 steel can be spot welded under production conditions. This has been determined by testing. With lower forces or lower weld current, the nuggets 52 do not consistently form in a necessary cylindrical configuration. Consequently, the information of FIG. 11 as graphically shown in FIGS. 12–14, is used to illustrate a preferred embodiment of the present invention, primarily for instance wherein there is less than about 5 hours between material application and clamping. Modifications could be made in these graphs as different metal are used. However, in practice, the electrode force and current are slightly increased as indicated in the charts of FIGS. 12 and 13.

Figure 15:
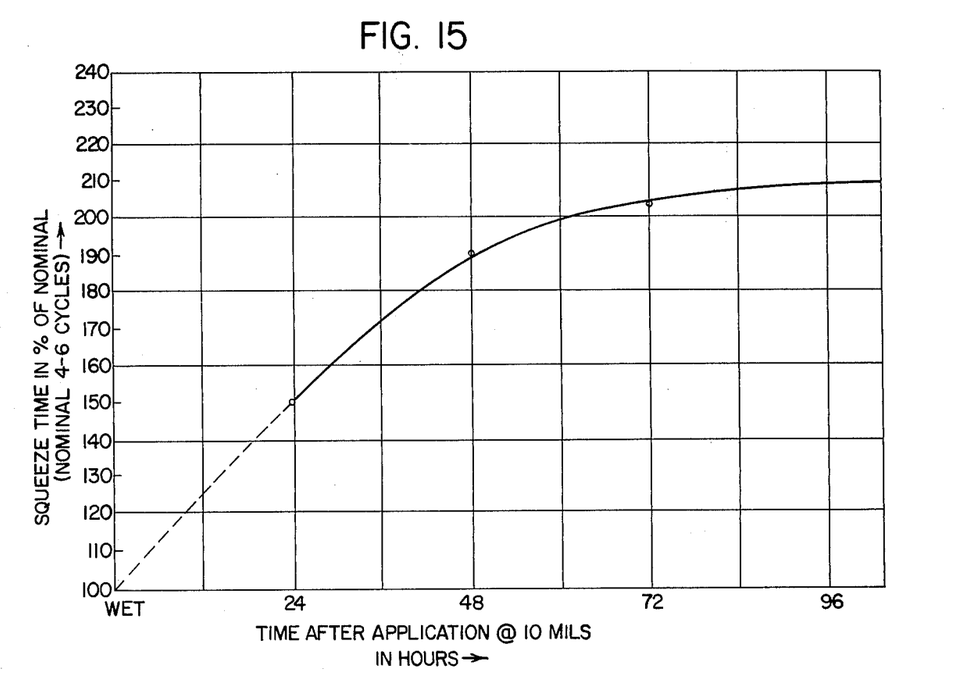
FIG. 15 is a graph showing the difference in squeeze time used in the present invention after the rustproofing material has been applied for various times.
Figure 16:
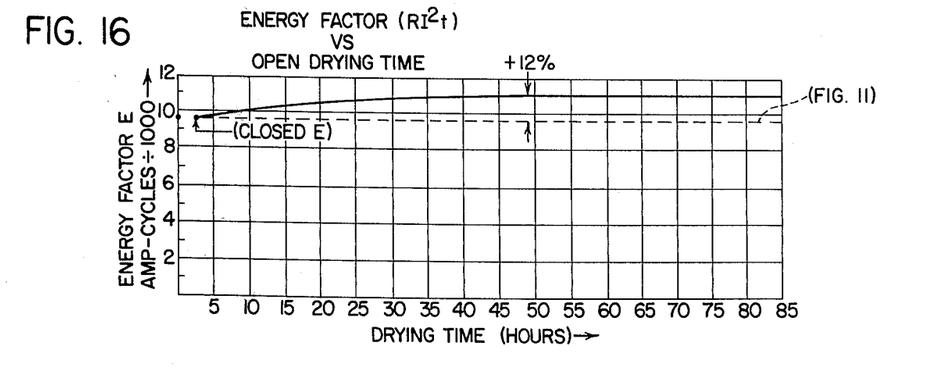
FIG. 16 is a graph showing the increase in the energy factor as the time between application of the material and the clamping of the workpieces is increased.

Referring now to FIG. 15, another characteristic of the preferred embodiment is illustrated. In this graph, which is illustrative in nature, the squeeze time increased according to the amount of exposure to atmosphere of material M prior to clamping of the seam preparatory to spot welding. As can be seen, after approximately 48–72 hours, the squeeze time remains somewhat constant at an increase of about 4–6 cycles in a 60 cycle timing circuit when approximately 10 mils of material M is placed on surface 20. Stated in another way, an intermediate hold time can be provided after the squeezing operation which intermediate hold time is dependent upon the drying or exposure time of material M after it is applied to surface 20. This concept is illustrated graphically in FIG. 17. Of course, all operations could use a squeeze time increased by 200%; however, this may unnecessarily slow the processing time which may be a substantial factor in high production and/or automatic spot welding. Referring now to FIG. 16, as the drying time increases, the energy factor required for the spot welding increases to appoximately 12%. The energy factor E is proportional to the resistance (R), the welding amperage squared ($I^2$) and the weld time ($t$). Thus as the drying time increases, the current and/or weld time is increased. In the preferred embodiment, as shown in FIG. 11, the energy factor E is indicated by the dashed lines in FIG. 16. Thus, the increase is over the adjusted increase in current illustrated in FIG. 11. FIG. 11 relates to an example wherein the material M is applied to surface 20 and immediately clamped together. Welding can occur immediately thereafter or at some later time; however, since the surfaces 20, 22 are in engagement there is no substantial exposure of material M to atmosphere for evaporation of the carrier solvent from material M prior to actual spot welding.

PROCEDURAL STEPS USING THE INVENTION

Figure 18A:
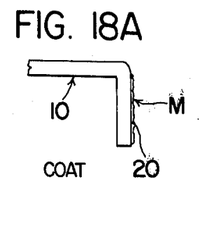
FIGS. 18A–18C are schematic views illustrating operating steps employed in the preferred embodiment of the present invention.
Figure 18B:
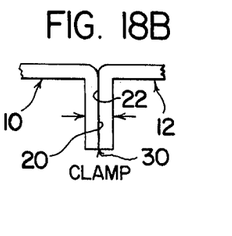
Figure 18C:
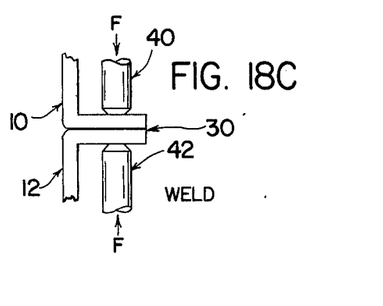

FIGS. 18A–18C are illustrative of the basic procedural steps used in the preferred embodiment of this invention. First, material M is coated onto surface 20, as shown in FIG. 18A. Surfaces 20, 22 are then clamped together by an appropriate jig or fixture indicated by the arrows shown in FIG. 18B. Thereafter, welding electrodes 40, 42 coact with the clamped sheet metal parts 10, 12 to spot weld seam 30, as shown in FIG. 18C. Of course, several spaced spot welds are contemplated.

Figure 17:
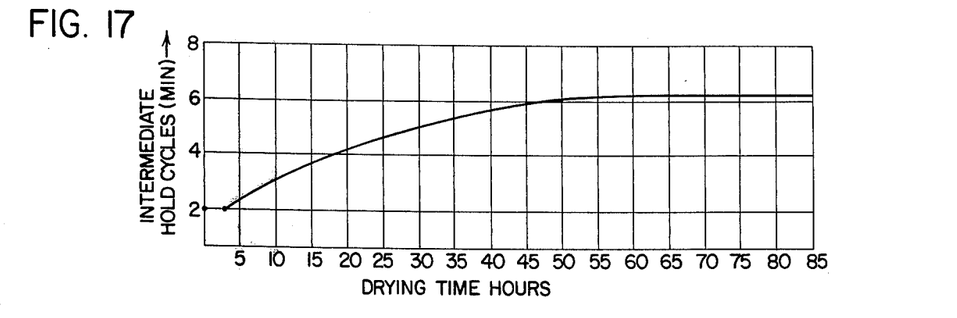
FIG. 17 is a graph similar to FIG. 16 illustrating the increase in the intermediate hold time employed as drying time increases.
Figure 19:
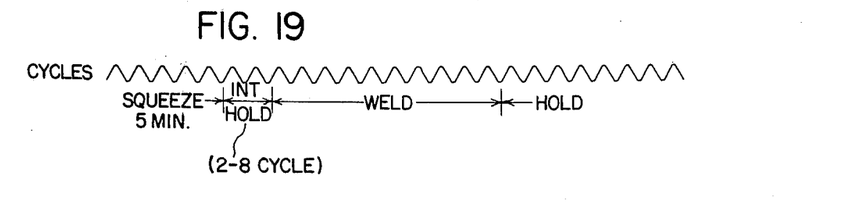
FIG. 19 is a cycle graph illustrating a spot welding sequence of events employed in the preferred embodiment of the present invention.

Referring now to FIG. 19, the upper portion indicates a 60 cycle control or timing current. As is known, approximately 8 milliseconds is employed for each cycle. In the illustrated embodiment, the intermediate hold cycle (INT HOLD) graphically illustrated in FIG. 17 is shown with relation to a background alternating circuit. This intermediate hold cycle is not employed in normal spot welding operations. It is used to assure that a sufficient amount of extra time is employed to force material M from weld zone 50 prior to energizing electrodes 40, 42. In the illustrated embodiment of the welding cycle, approximately at least 5 cycles are used for the squeeze time. During the squeeze time, electrodes 40, 42 have moved together to a place where the resistance of parts 10, 12 is sufficient to substantially inhibit the movement of the electrodes toward each other. The intermediate hold time, which may vary from between approximately 2 to 8 cycles, which is between about 16 to about 67 microseconds, is provided to assure substantially metal-to-metal contact in zone 50 prior to energizing electrodes 40, 42. This intermediate hold cycle is extended according to the drying time of the material M before surfaces 20, 22 are clamped together, as discussed in connection with FIG. 7. Thereafter, a standard weld cycle is performed. This operation welds parts 10, 12 together. While maintaining the force on electrodes 40, 42 the spot weld cycle then shifts into the HOLD cycle. Current is turned off and the spot weld cools the solidified nugget 52 in weld zone 50.

GRAPHIC ILLUSTRATION OF MATERIAL CHARACTERISTICS

Figure 20:
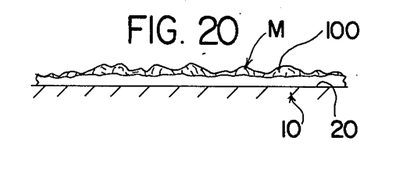
FIG. 20 is a schematic view showing the heat insulating crust developed on the material used in the preferred embodiment of the invention while burning the solvent therefrom.
Figure 20A:
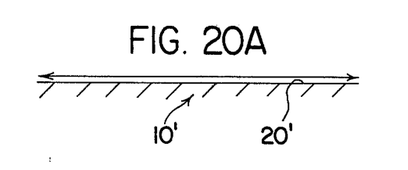
FIG. 20A is a view similar to FIG. 20 and illustrating a solvent burning procedure used in the other types of rustproofing material not having the characteristics intended for use in the preferred embodiment of the present invention.
Figure 21:
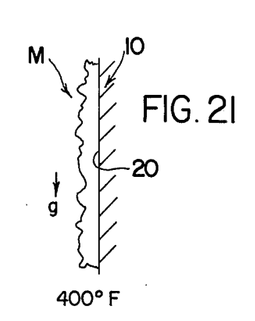
FIG. 21 is a schematic view illustrating the thixotropic and non-flowing characteristics of the material employed in the preferred embodiment of the invention.
Figure 21A:
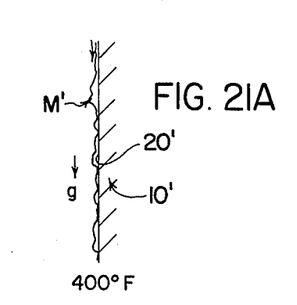
FIG. 21A is a view similar to FIG. 21 and illustrating a material not having the low flow characteristics at high temperature as contemplated for use in the preferred embodiment of the invention; and, FIGS. 22–24 are schematic illustrations of various methods for applying the rustproofing material to a surface preparatory to spot welding the surface as contemplated by the present invention.
Figure 22:
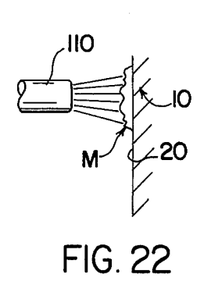
Figure 23:
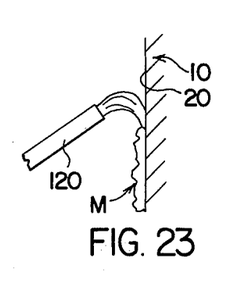
Figure 24:
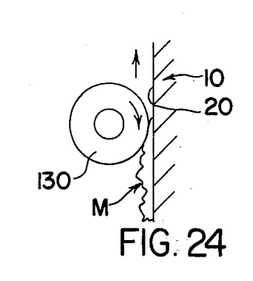

The material M utilized in the preferred embodiment of the invention is explained and defined with respect to certain characteristics. One of these characteristics is the formation of a crust which is pliable, coherent and heat insulating and is formed when the solvent of material M is burnt. This is illustrated in FIG. 20 wherein the gel 100 can be created by burning solvent of material M. As can be seen, during the burning operation depicted in FIG. 20, material M does not flow from surface 20. The burning operation forms a gel 100 which remains stable on surface 20. Referring now to FIG. 20A, other types of corrosion resistant material, not contemplated for use in the present invention, will burn as shown. As the material burns, it spreads from surface 20' leaving the surface generally bare after the solvent has been burned. Another characteristic of the present invention is illustrated in FIG. 21 wherein the thixotropic nature of material M is maintained at a temperature of about 400° F. Gravity force does not cause the material M to sag even when surface 20 is placed in the vertical direction. Material M has the physical consistency of a heavy grease and can be made flowable by pressure. The viscosity can be controlled by the amount of solvent. This consistency of material M is as applied and does not require drying time for evaporation of the solvent. Other materials, i.e. material M', when placed upon a surface 20' at a temperature of 400° F. will melt and run as indicated in FIG. 21A. Thus, during the welding operation, such material would melt and run from between surfaces 20, 22 and preclude coherent corrosion resistance between the material even if the spot welding nuggets are sound. In most instances, the spot welding will not be sound even though the material runs as indicated in FIG. 21A. Referring now to FIGS. 22–24, these figures graphically illustrate that the material M may be sprayed, brushed, or rolled onto surface 20. A spray nozzle 110 is illustrated in FIG. 22. A brush 120 is illustrated in FIG. 23. A roller, of the type used in applying paint, is illustrated as roller 130 in FIG. 24. Thus, after material M is applied to surface 20, it will cling to and remain on the surface because of the thixotropic nature of the material and the infinity of the material for metal much in the manner of grease.

Seams welded in accordance with this method have been subjected to standard corrosion tests. These seams have exceeded 3000 hours in a standard salt spray cabinet and have been baked for over 500 hours at elevated temperatures exceeding 200° F. without setting, hardening or cracking.

Having thus defined the invention, the following is claimed:

1. A method of joining first and second sheet metal parts along a common seam formed by a first surface on said first part and a second surface on said second part, said surfaces being in abutting relationship and having a corrosion resistant layer therebetween, said method comprising the steps of:
   (a) providing a thixotropic, non-hardening corrosion resistant material including a solvent and having negligible gravity flow at temperatures less than 400° F. to 440° F. and forming a heat insulating, coherent gel when said solvent is burnt;
   (b) applying a layer of said material of at least about 6 mils over said first surface;
   (c) clamping said first and second surfaces together to form a common seam;
   (d) placing spot welding electrodes on opposite sides of said seam and engaging said clamped metal parts at a weld zone extending through said parts;
   (e) forcing said electrodes together at a selected pressure until the rate of change in the thickness of said layer per time is substantially zero, said selected pressure being greater than the electrode pressure necessary for spot welding third and fourth parts, respectively identical to said first and second parts at said seam and without said material therebetween;
   (f) then passing a welding current of a selected amperage between said electrodes for a weld time sufficient to melt the metal of said parts at said surfaces and in said weld zone while continuing said forcing step at said selected pressure; and,
   (g) after discontinuing said current, continuing said forcing step for a time sufficient to allow cooling and solidification of the melted metal of said parts in said weld zone.

2. The method as defined in claim 1 wherein said selected pressure is approximately 15–20% greater than the electrode pressure necessary for spot welding third and fourth parts, respectively identical to said first and second parts at said seam and without said material therebetween.

3. The method as defined in claim 1 wherein said selected amperage is approximately 2.5–3.5% greater than th electrode amperage necessary for spot welding third and fourth parts, respectively identical to said first and second parts at said seam, and without said material therebetween.

4. A method of joining first and second sheet metal parts along a common seam formed by a first surface on said first part and a second surface on said second part, said surfaces being in abutting relationship and having a corrosion resistant layer therebetween, said method comprising the steps of:
   (a) providing a thixotropic, non-hardening corrosion resistant material including a solvent and having negligible gravity flow at temperatures less than 400° F. to 440° F. and forming a heat insulating, coherent gel when said solvent is burnt;
   (b) applying a layer of said material of at least about 6 mils over said first surface;
   (c) clamping said first and second surfaces together to form a common seam;
   (d) placing spot welding electrodes on opposite sides of said seam and engaging said clamped metal parts at a weld zone extending through said parts;
   (e) forcing said electrodes together at a selected pressure, said selected pressure being greater than the electrode pressure necessary for spot welding third and fourth parts, respectively identical to said first and second parts at said seam and without said material therebetween;
   (f) then passing a welding current of a selected amperage between said electrodes for a weld time sufficient to melt the metal of said parts at said surfaces and in said weld zone while continuing said forcing step at said selected pressure;
   (g) simultaneously, heating said material surrounding said weld zone at a temperature to burn said solvent and form an annular heat insulating gel barrier between said material layer and said weld zone which gel barrier protects said layer and expands outwardly from said weld zone to form an annular chamber around said zone;
   (h) after discontinuing said current, continuing said forcing step for a time sufficient to allow cooling and solidification of the melted metal of said parts in said weld zone; and,
   (i) allowing said weld zone to cool to an ambient temperature whereby said material of said layer forces said gel barrier radially inwardly into said annular chamber and toward said weld zone to provide an annularly continuous barrier for said solidified metal of said weld zone.

5. A method of joining first and second sheet metal parts along a common seam formed by a first surface on said first part and a second surface on said second part, said surfaces being in abutting relationship and having a corrosion resistant layer therebetween, said method comprising the steps of:
   (a) providing a thixotropic, non-hardening corrosion resistant material including a solvent and having negligible gravity flow at temperatures less than about 400° F. to 440° F. and forming a heat insulating, coherent gel when said solvent in burnt;
   (b) applying a layer of said material of at least about 6–10 mils over said first surface;
   (c) clamping said first and second surfaces together to form said common seam;
   (d) placing spot welding electrodes on opposite sides of said seam and engaging said clamped metal parts at a weld zone extending through said parts;
   (e) forcing said electrodes together at a selected pressure approximately 15–20% greater than the electrode pressure necessary for spot welding third and fourth parts at said seam and without said material therebetween;
(f) continuing said forcing step at said selected pressure until said material is squeezed from said weld zone between said surfaces to at least about 1 mil;
(g) then passing a welding current of a selected amperage between said electrodes for a weld time sufficient to melt the metal of said parts at said surfaces and in said weld zone while continuing said forcing step at said selected pressure; and,
(h) after discontinuing said current, continuing said forcing step for a time sufficient to allow solidification of said melted metal of said parts in said weld zone.

6. A method of joining first and second sheet metal parts along a common seam formed by a first surface on said first part and a second surface on said second part, said surfaces being in abutting relationship and having a corrosion resistant layer therebetween, said method comprising the steps of:
(a) providing a thixotropic, non-hardening corrosion resistant material including a solvent and having negligible gravity flow at temperatures less than about 400° F. to 440° F. and forming a heat insulating, coherent gel when said solvent is burnt;
(b) applying a layer of said material of at least about 6-10 mils over said first surface;
(c) clamping said first and second surfaces together to form said common seam;
(d) placing spot welding electrodes on opposite sides of said seam and engaging said clamped metal parts at a weld zone extending through said parts;
(e) forcing said electrodes together at a selected pressure;
(f) continuing said forcing step until said material is squeezed from said weld zone between said surfaces to at least about 1 mil;
(g) then passing a welding current of a selected amperage between said electrodes for a weld time sufficient to melt the metal of said parts at said surfaces and in said weld zone while continuing said forcing step, said selected amperage being approximately 2.5-3.5% greater than the electrode amperage necessary for spot welding third and fourth parts, respectively identical to said first and second parts at said seam, and without said material therebetween; and,
(h) after discontinuing said current, continuing said forcing step for a time sufficient to allow solidification of said melted metal of said parts in said weld zone.

7. A method of joining first and second sheet metal parts along a common seam formed by a first surface on said first part and a second surface on said second part, said surfaces being in abutting relationship and having a corrosion resistant layer therebetween, said method comprising the steps of:
(a) providing a thixotropic, non-hardening corrosion resistant material including a solvent and having negligible gravity flow at temperatures less than about 400° F. to 440° F. and forming a heat insulating, coherent gel when said solvent is burnt;
(b) applying a layer of at least about 6-10 mils over said first surface;
(c) allowing said solvent on said first surface to evaporate in ambient conditions for a time X, wherein X is greater than about 5 hours;
(d) clamping said first and second surfaces together to form said common seam;
(e) placing spot welding electrodes on opposite sides of said seam and engaging said clamped metal parts at a weld zone extending through said parts;
(f) forcing said electrodes together at a selected pressure until movement of said electrodes is substantially halted by reactive force from said parts, said selected pressure being approximately 15-20% greater than the electrode pressure necessary for spot welding third and fourth parts, respectively identical to said first and second parts at said seam and without said material therebetween;
(g) continuing said forcing step for a time exceeding about 16 milliseconds;
(h) then passing a welding current of a selected amperage between said electrodes for a weld time sufficient to melt the metal of said parts at said surfaces and in said weld zone while continuing said forcing step, said selected amperage is approximately 2.5-3.5% greater than the electrode amperage necessary for spot welding third and fourth parts, respectively identical to said first and second parts at said seam, and without said material therebetween; and,
(i) after discontinuing said current, continuing said forcing step for a time sufficient to allow solidification of said melted metal of said parts in said weld zone.

8. A method of joining first and second sheet metal parts along a common seam formed by a first surface on said first part and a second surface on said second part, said surfaces being in abutting relationship and having a corrosion resistant layer therebetween, said method comprising the steps of:
(a) providing a thixotropic, non-hardening corrosion resistant material including a solvent and having negligible gravity flow at temperatures less than about 400° F. to 440° F. and forming a heat insulating, coherent gel when said solvent is burnt;
(b) applying a layer of at least about 6-10 mils over said first surface;
(c) allowing said solvent on said first surface to evaporate in ambient conditions for a time X, wherein X is greater than about 5 hours;
(d) clamping said first and second surfaces together to form said common seam;
(e) placing spot welding electrodes on opposite sides of said seam and engaging said clamped metal parts at a weld zone extending through said parts;
(f) forcing said electrodes together at a selected pressure until movement of said electrodes is substantially halted by reactive force from said parts;
(g) continuing said forcing step for a time exceeding about 16 milliseconds;
(h) then passing a welding current of a selected amperage between said electrodes for a weld time sufficient to melt the metal of said parts at said surfaces and in said weld zone while continuing said forcing step, said selected amperage is approximately 2.5-3.5% greater than the electrode amperage necessary for spot welding third and fourth parts, respectively identical to said first and second parts at said seam, and without said material therebetween; and,
(i) after discontinuing said current, continuing said forcing step for a time sufficient to allow solidification of said melted metal of said parts in said weld zone.

9. A method of joining first and second sheet metal parts along a common seam formed by a first surface on said first part and a second surface on said second part, said surfaces being in abutting relationship and having a corrosion resistant layer therebetween, said method comprising the steps of:
(a) providing a thixotropic, non-hardening corrosion resistant material including a solvent and having negligible gravity flow at temperatures less than about 400° F. to 440° F. and forming a heat insulating, coherent gel when said solvent is burnt;
(b) applying a layer of at least about 6–10 mils over said first surface;
(c) allowing said solvent on said first surface to evaporate in ambient conditions for a time X, wherein X is greater than about 48 hours;
(d) clamping said first and second surfaces together to form said common seam;
(e) placing spot welding electrodes on opposite sides of said seam and engaging said clamped metal parts at a weld zone extending through said parts;
(f) forcing said electrodes together at a selected pressure until movement of said electrodes is substantially halted by reactive force from said parts;
(g) continuing said forcing step for a time exceeding about 16 milliseconds;
(h) then passing a welding current of a selected amperage between said electrodes for a weld time sufficient to melt the metal of said parts at said surfaces and in said weld zone while continuing said forcing step, the product of said weld time and said selected amperage squared is at least about 10% greater than the product of the weld time and the square of the electrode amperage necessary for spot welding third and fourth parts, respectively identical to said first and second parts of said seam, and without said material therebetween; and,
(i) after discontinuing said current, continuing said forcing step for a time sufficient to allow solidification of said melted metal of said parts in said weld zone.

10. A method as defined in claim 9 wherein said continuing step is performed for a time exceeding about 50 milliseconds.

11. A method of joining first and second sheet metal parts along a common seam formed by a first surface on said first part and a second surface on said second part, said surfaces being in abutting relationship and having a corrosion resistant layer therebetween, said method comprising the steps of:
(a) providing a thixotropic, non-hardening corrosion resistant material including a solvent and having negligible gravity flow at temperatures less than 400° F. to 440° F. and forming a heat insulating, coherent gel when said solvent is burnt;
(b) applying a layer of said material of at least about 6 mils over said first surface;
(c) clamping said first and second surfaces together to form a common seam;
(d) placing spot welding electrodes on opposite sides of said seam and engaging said clamped metal parts at a weld zone extending through said parts;
(e) forcing said electrodes together at a selected pressure until the rate of change in thickness of said layer per time is substantially zero;
(f) then passing a welding current of a selected amperage between said electrodes for a weld time sufficient to melt the metal of said parts at said surfaces and in said weld zone while continuing said forcing step, said selected amperage being approximately 2.5–3.5% greater than the electrode amperage necessary for spot welding third and fourth parts, respectively identical to said first and second parts of said seam, without said material therebetween; and,
(g) after discontinuing said current, continuing said forcing step for a time sufficient to allow cooling and solidification of the melted metal of said parts in said weld zone.

* * * * *